Patented Apr. 20, 1948

2,440,095

UNITED STATES PATENT OFFICE 2,440,095

2-MERCAPTO THIAZINES AND METHOD OF PREPARING SAME

Jacob Eden Jansen, Akron, Ohio, assignor to The B. F. Goodrich Company, New York, N. Y., a corporation of New York No Drawing. Application October 5, 1944, Serial No. 557,384

12 Claims. (Cl. 260—243)

This invention relates to a new chemical reaction, and pertains more specifically to a reaction between dithiocarbamic acid and an alpha, beta-unsaturated carbonyl or nitrile compound.

I have found that dithiocarbamic acid will react with a compound containing the structure

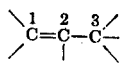

where the third carbon atom is directly connected by means of an unsaturated linkage to a member of the class consisting of oxygen or nitrogen. Although the structure of the products is not definitely known, it is believed that they are 2-mercaptothiazines. The reaction is believed to proceed first by addition of the dithiocarbamic acid to the ethylenic double bond followed by ring closure. The products are useful as accelerators for the vulcanization of rubber and also as insecticides, fungicides, and as stimulants for plant growth.

The dithiocarbamic acid employed in the reaction is preferably generated in situ, because of the instability of the free acid, by adding a dithiocarbamic acid salt to an acid solution or suspension of the unsaturated compound with which the dithiocarbamic acid is to be reacted.

The alpha, beta-unsaturated carbonyl or nitrile compounds with which the dithiocarbamic acid may be reacted include the alpha, beta-unsaturated aldehydes, ketones, acids, esters, amides, acid chlorides, anhydrides, salts, and nitriles. Benzaldehyde, benzoic acid, etc., in which the unsaturation is present in an aromatic ring and which, therefore, are not regarded as being "alpha-beta unsaturated compounds," are inoperative and are not included within the scope of my invention.

Among the unsaturated aldehydes which will react to give useful products acrolein, methacrolein, tiglaldehyde, 2-ethyl-2-hexenal, crotonaldehyde, cinnamaldehyde, alpha-ethyl acrolein, alpha-methyl-beta-ethyl acrolein, alpha-propyl acrolein, alpha-isobutylidene propionaldehyde, alpha-isobutyl acrolein, alpha-bromoacrolein, alpha-chlorocrotonaldehyde, alpha, gamma-dichlorocrotonaldehyde, and the like.

Representative examples of the alpha, beta-unsaturated ketones which may be employed include, among others, methyl vinyl ketone, ethyl vinyl ketone, mesityl oxide, benzalacetone, benzalacetophenone, styryl ketone, ethylidene acetone, isobutylidene acetone, furfurylidene acetone, anisal acetone, propyl propenyl ketone, trichloroethylidene acetone, chloromesityl oxide, alpha-nitro mesityl oxide, and other similar materials.

Typical examples of the alpha, beta-unsaturated acids which may be employed are acrylic, methacrylic, ethacrylic, cinnamic, alpha-phenylcinnamic, alpha-ethylcinnamic, o-coumaric, tiglic, beta-benzoylacrylic, atropic, beta-propylacrylic beta-vinylacrylic, crotonic, alpha-ethyl-crotonic, citraconic, alpha - chloroacrylic, alpha-bromoacrylic, beta-chloroacrylic, beta-hydroxyacrylic, alpha-chlorocrotonic, o-nitrocinnamic, and other similar acids, as well as the esters of such acids with all types of alcohols, e. g., methyl acrylate, butyl acrylate, benzyl acrylate, methyl methacrylate, isobutyl methacrylate, allyl cinnamate, ethyl cinnamate, phenyl cinnamate, styracin, o- tolyl alpha-phenylcinnamate, ethyl alpha-ethylcinnamate, propyl o-coumarate, isoamyl tiglate, ethyl atropate, ethyl beta-propylacrylate, methyl crotonate, ethyl alpha-ethylcrotonate, dimethyl citraconate, ethyl beta-chloroacrylate, ethyl alpha-bromoacrylate, methyl alpha-chlorocrotonate, ethyl o-nitrocinnamate, and the like.

There may also be employed the salts of the foregoing acids, such as the ammonium, sodium, potassium, barium, calcium etc., salts, e. g., sodium acrylate, calcium methacrylate, potassium crotonate, ammonium citraconate, magnesium cinnamate, and the like. Other compounds which contain the desired structure and which are within the scope of the invention include the amides of alpha, beta-unsaturated acids, such as acrylamide, crotonamide, cinnamamide, cinnamic ethyl amide, citracondiamide, atropamide, coumaramide, alpha-ethylcinnamamide, alpha-phenyl cinnamamide, alpha-chlorocrotonamide, o-nitrocinnamamide, and other similar amides, as well as the anhydrides and acid chlorides of these unsaturated acids such as acrylic anhydride, crotonic anhydride, citraconic anhydride, connamic anhydride, acrylyl chloride, crotonyl chloride, tiglyl chloride, alpha-ethylcrotonyl chloride, citraconyl chloride, atropyl chloride, cinnamoyl chloride, alpha-ethylcinnamoyl chloride, alpha-chlorocrotonyl chloride, o-nitrocinnamoyl chloride, and other similar compounds.

The nitriles which may be used, of course, are those which correspond in structure to the alpha, beta-unsaturated acids, such as acrylonitrile, methacrylonitrile, crotononitrile, monoethyl ester of citracono-mononitrile, alpha-ethylcrotononitrile, cinnamonitrile, alpha-phenylcinnamonitrile, alpha-chlorocrotononitrile, o-nitrocinnamonitrile, and the like.

I have found that the reaction may be carried out over a wide range of temperatures from 0° to about 100° C. or even higher, although usually it is desirable, because of the instability of dithiocarbamic acid, to carry out the reaction by mixing the reactants at a temperature of about 0° to about 40° C. I have found that best results are obtained by mixing the reactants at about 15 to 25° C. followed by heating the mixture for a short time at about 50° to 100° C. Since the reaction is quite rapid, it is usually desirable to carry it out by dissolving the reactants in alcohol, acetone, diethyl ether, dioxane, or other suitable solvent, or by dispersing the reactants in water or other inert medium. When water is used as the reaction diluent any of the usual wetting or emulsifying agents may be employed to assist in dispersing the reactants in the medium, although this step usually is unnecessary. The amount of diluent employed is not critical; solutions or dispersions containing from about 5 to 60 percent or more of the reactants may be employed.

The reagents are employed in approximately equimolar proportions; since the reaction is practically quantitative even at temperatures in the neighborhood of 10° C., an excess of either reagent is unnecessary. In practice, however, it is found that a slight excess of the unsaturated carbonyl or nitrile compound is to be preferred to an excess of the dithiocarbamic acid because of the tendency of the latter to decompose. When the dithiocarbamic acid is generated in situ, as was discussed above, any of the commercially available acids such as hydrochloric, nitric, phosphoric, sulphuric, acetic, or the like, may conveniently be used to liberate the dithiocarbamic acid from its salts. When the reaction is carried out in this fashion, the precise order in which the reagents are mixed is not important. For example, a mixture of the unsaturated carbonyl or nitrile compounds with sufficient acid to react with the dithiocarbamate may be prepared, and a solution of a salt of dithiocarbamic acid may be added slowly to it; or if desired, a mixture of the unsaturated carbonyl or nitrile compound with a salt of dithiocarbamic acid may be prepared, and the hydrochloric or other acid may be added to this mixture. A third procedure which may be used comprises adding a salt of dithiocarbamic acid and an acid such as hydrochloric simultaneously to the unsaturated carbonyl or nitrile compound.

The reaction is usually carried out at atmospheric pressure, although, of course, if a low-boiling solvent such as diethyl ether is employed, it may be necessary to use an autoclave, particularly in the last stages of the reaction.

The following specific examples will serve more fully to illustrate the nature of my reaction.

Example I

A mixture of 400 grams of 37% aqueous hydrochloric acid and 500 cc. of water was added to 400 grams of mesityl oxide. To this mixture a 980-gram portion of a 40% aqueous solution of ammonium dithiocarbamate was slowly added through a dropping funnel over a period of about one hour with constant stirring and cooling to keep the temperature at about 10° to 20° C. At this point the reaction mixture contains both oily and solid material in suspension. The mixture was then heated to about 50° C. for one hour and subsequently cooled to room temperature, whereupon substantially all of the oily material was found to have solidified. The small amount of oily material was removed by adding about 500 cc. of hexane, leaving the product in suspension in the water in the form of pale yellow crystals, which were filtered off, washed and dried. The product, obtained in a yield of 560 grams (91% of the theoretical) melted at 94 to 96° C. It was believed to be 2-mercapto-4,6,6-trimethylthiazine, produced in accordance with the following equation:

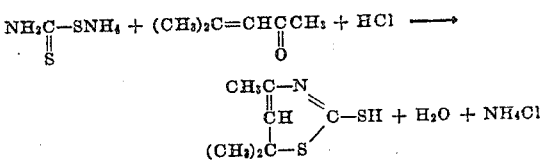

An analysis of a portion of the product which had been purified by recrystallizing from a mixture of hexane and diethyl ether confirmed this hypothesis as to the structure of the product. The purified product melted at 96 to 97° C. The analysis was as follows:

| | Percent calculated for $C_7H_{13}S_2N$ | Per cent found |
|---|---|---|
| C | 48.51 | 48.57 |
| H | 6.40 | 6.50 |
| S | 37.00 | 37.07 |
| N | 8.08 | 8.10 |

Example II

If, in following the general procedure described under Example I, the reaction mixture is heated insufficiently or for too short a period, an intermediate product may be formed instead of the mercapto trimethylthiazine of Example I. It has been found that this intermediate product is useful for all of the purposes for which the final product may be used. It also may be easily converted into the mercapto trimethylthiazine by heating it at a temperature of about 50° to 100° C. The reaction, which appears to be a dehydration reaction, is facilitated by the presence of a strong mineral acid such as hydrochloric acid, sulfuric acid, etc. The following paragraph describes the preparation of this intermediate product in more detail.

A mixture of 400 grams of 37% aqueous hydrochloric acid and 500 cc. of water was added to 410 grams of mesityl oxide. To this mixture a 1000-gram portion of a 40% aqueous solution of ammonium dithiocarbamate was slowly added through a dropping funnel over a period of about 45 minutes with constant stirring and cooling to maintain the temperature at about 10 to 15° C. The resultant mixture was then heated to about 50° C. for about 20 minutes. After washing the mixture with a 600 cc. portion of hexane, a fine white crystalline material separated, which, after recrystallization from benzene, melted at about 128 to 129° C. The product was believed to be 2-mercapto-4-hydroxy-4,6,6-trimethyldihydrothiazine, produced according to the following equation:

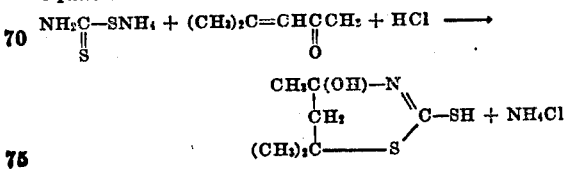

The composition of the product was confirmed by an analysis, which gave the following results:

|   | Percent calculated for $C_7H_{13}S_2NO$ | Per cent found |
|---|---|---|
| C | 43.93 | 43.90 |
| H | 6.85 | 6.90 |
| S | 33.53 | 33.43 |
| N | 7.33 | 7.40 |
| O | 8.37 | [1] 8.37 |

[1] By difference.

*Example III*

A 5-gram portion of the purified product obtained in Example II was mixed with 40 cc. of 10% aqueous hydrochloric acid, and heated at 90° C. for about 30 minutes. The organic material separated to form a liquid layer, which solidified upon cooling. After grinding the material, washing with water and drying, a white powder was obtained which melted at 93 to 95° C. When mixed with the purified product obtained in Example I (melting point 96 to 97°), a mixed melting point of 94 to 96° C. was obtained. The product, therefore, appeared to be identical with the product of Example I. The equation of the reaction is believed to be:

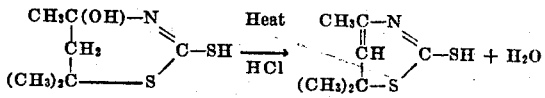

*Example IV*

A 108.5-gram portion of 37% aqueous hydrochloric acid was added to 154 grams of methyl propyl ketone dimer,

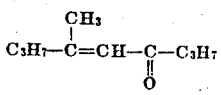

and the mixture was cooled to about 20° C. A 302.5-gram portion of a 40% aqueous solution of ammonium dithiocarbamate was stirred into the mixture, which was then heated to about 50° C. with continued stirring. After cooling to room temperature, the oil layer was separated from the water layer, and washed several times with 500 cc. portions of water. The product was heated to 140° C. at 2 mm. pressure to remove a small amount of low boiling material, leaving a brown viscous tar as the chief product. Qualitative tests showed the presence of both nitrogen and sulphur in this product, which is believed to be either 2-mercapto-4-hydroxy-6-methyl-4,6 - dipropyldihydrothiazine or 2-mercapto-6-methyl-4,6-dipropylthiazine.

*Example V*

A mixture of 202 grams of a 37% aqueous hydrochloric acid solution and 160.5 grams of redistilled methyl acrylate having a boiling point of 77 to 80° C. was prepared. To this mixture there were added 564 grams of a 40% aqueous solution of ammonium dithiocarbamate over a period of about 40 minutes, while maintaining the temperature at about 10° to 15° C. A pale yellow oil was formed, which was separated from the water layer, and which solidified into a crystalline mass upon further cooling. The crystals were purified by washing with hexane and with water. This product had a melting point of 69 to 70° C.

*Example VI*

A mixture of 110 grams of 37% aqueous hydrochloric acid and 53 grams of acrylonitrile was prepared. A 303-gram portion of a 40% aqueous solution of ammonium dithiocarbamate was added to the mixture slowly and with stirring at a temperature of about 25° to 30° C. After the addition of the reagent was completed, the mixture was heated to about 50° C. for a short time, and allowed to cool to room temperature. The reaction product, of unknown chemical structure, separated from the mixture in the form of a clear, yellow oil, which could not be distilled even at reduced pressures and at temperatures as high as 150° C.

Other alpha-beta unsaturated carbonyl and nitrile compounds react similarly with dithiocarbamic acid to give products which are useful as accelerators of vulcanization or as insecticides, etc. When used as accelerators, with either natural or synthetic rubber, these materials produce vulcanized compositions of unusually low brittleness.

These products enter into further reactions which are analogous to the reactions of the mercaptothiazoles or mercaptothiazolines, and the products of which are useful for the same general purposes as the products of my reaction. For example, the 2-mercapto-4-6-6-trimethylthiazine produced in Example I may be oxidized with ammonium persulfate or other suitable oxidizing agent to the corresponding disulfide. The metallic salts, such as the lead or zinc salts, may readily be prepared; and the amine salts of these compounds, for example, the cyclohexyl amine or diamyl amine salts, may be readily oxidized to the corresponding sulfenamides.

Although I have herein disclosed specific embodiments of my invention, I do not intend to limit myself solely thereto, but to include all of the obvious variations and modifications falling within the spirit and scope of the appended claims. Related subject matter, and subject matter disclosed but not claimed herein form the subjects of my allowed application Serial No. 687,521, filed July 31, 1946, of an allowed application of Frank Swedish, Serial No. 688,960, filed August 7, 1946, and of my divisional application filed March 19, 1948.

I claim:

1. The process which comprises bringing together at a temperature from about 0 to 100° C., dithiocarbamic acid and an alpha-beta unsaturated carbonyl compound of the structure

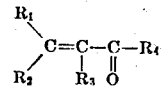

wherein $R_1$, $R_2$ and $R_3$ are selected from the class consisting of hydrogen, chlorine, hydrocarbon radicals, chlorine-substituted hydrocarbon radicals and oxy-substituted hydrocarbon radicals and $R_4$ is selected from the class consisting of hydrogen and hydrocarbon radicals, whereupon the dithiocarbamic acid adds to the alpha-beta unsaturation and ring closure occurs to form a 2-mercapto thiazine having a single bond between the ring carbon atoms in the 5 and 6 positions and then recovering the said 2-mercapto thiazine.

2. The process which comprises adding a salt of dithiocarbamic acid to a mixture of an alpha-beta unsaturated carbonyl compound

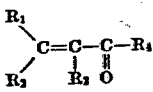

wherein $R_1$, $R_2$ and $R_3$ are selected from the class consisting of hydrogen, chlorine, hydrocarbon radicals, chlorine-substituted hydrocarbon radicals and oxy-substituted hydrocarbon radicals, and $R_4$ is selected from the class consisting of hydrogen and hydrocarbon radicals, with an aqueous solution of a mineral acid at a temperature of about 0 to 100° C., whereupon dithiocarbamic acid liberated in situ adds to the alpha-beta unsaturation and ring closure occurs to form a compound having the probable structure of a 2-mercaptothiazine having a single bond between the ring carbon atoms in the 5 and 6 positions, and then recovering the said 2-mercaptothiazine.

3. The process of claim 2 wherein $R_1$, $R_2$ and $R_4$ are alkyl radicals and $R_3$ is hydrogen.

4. The process which comprises adding a salt of dithiocarbamic acid to a mixture of an alpha-beta unsaturated ketone

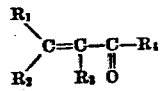

wherein $R_1$, $R_2$ and $R_3$ are selected from the class consisting of hydrogen, chlorine, hydrogen radicals, chlorine-substituted hydrocarbon radicals and oxy-substituted hydrocarbon radicals and $R_4$ is selected from the class consisting of hydrogen and hydrocarbon radicals, with an aqueous solution of a mineral acid at a temperature of 0 to 40° C., whereupon dithiocarbamic acid liberated in situ adds to the alpha-beta unsaturation and ring closure occurs to form a 2-mercapto-4-hydroxythiazine, subsequently heating the reaction mixture to a temperature of about 50 to 100° C., whereupon the 2-mercapto-4-hydroxythiazine is dehydrated to produce a 2-mercaptothiazine having a double bond between the ring carbon atoms in the 4 and 5 positions and a single bond between the ring carbon atoms in the 5 and 6 positions, and then recovering the said 2-mercaptothiazine.

5. The process which comprises adding a salt of dithiocarbamic acid to a mixture of mesityl oxide with an aqueous solution of a mineral acid at a temperature of about 0 to 100° C., whereupon dithiocarbamic acid liberated in situ adds the alpha-beta unsaturation of mesityl oxide and ring closure occurs to form 2-mercapto-4-hydroxy-4,6,6-trimethyldihydrothiazine, and then recovering the said 2 - mercapto - 4 - hydroxy-4,6,6-trimethyldihydrothiazine.

6. The process which comprises adding a salt of dithiocarbamic acid to a mixture of mesityl oxide with an aqueous solution of a mineral acid at a temperature of about 0 to 40° C., subsequently heating the reaction mixture to a temperature of about 50 to 100° C., whereupon to form 2-mercapto-4,6,6-trimethylthiazine, and then recovering the said 2-mercapto-4,6,6-trimethylthiazine.

7. The process of claim 6 wherein the salt of dithiocarbamic acid is ammonium dithiocarbamate.

8. An organic compound selected from the class consisting of 2-mercapto thiazines of the formulae:

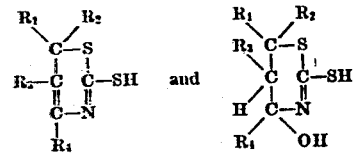

wherein $R_1$, $R_2$ and $R_3$ are selected from the class consisting of hydrogen, chlorine hydrocarbon radicals, chlorine-substituted hydrocarbon radicals and oxy-substituted hydrocarbon radicals and $R_4$ is selected from the class consisting of hydrogen and hydrocarbon radicals.

9. A 2-mercapto thiazine of the formula

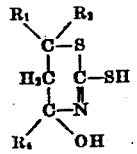

wherein $R_1$, $R_2$ and $R_4$ are alkyl radicals.

10. A 2-mercapto thiazine of the formula

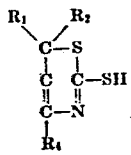

wherein $R_1$, $R_2$ and $R_4$ are alkyl radicals.

11. 2-mercapto-4-hydroxy -4,6,6- trimethyldihydrothiazine, a crystalline compound having a melting point of about 128 to 129° C.

12. 2-mercapto-4,6,6-trimethylthiazine, a pale yellow crystalline compound having a melting point of about 93 to 97° C.

JACOB EDEN JANSEN.

REFERENCES CITED

The following references are of record in the file of this patent:

UNITED STATES PATENTS

| Number | Name | Date |
|---|---|---|
| 2,050,190 | Lichty | Aug. 4, 1936 |
| 2,086,186 | Messer | June 6, 1937 |
| 2,170,059 | Mathes | Aug. 22, 1939 |
| 2,271,430 | Pinckney | Jan. 27, 1942 |
| 2,325,720 | Urbschat et al. | Aug. 3, 1943 |
| 2,356,172 | Mathes | Aug. 22, 1944 |

Certificate of Correction

Patent No. 2,440,095.                                                                                               April 20, 1948.

JACOB EDEN JANSEN

It is hereby certified that errors appear in the printed specification of the above numbered patent requiring correction as follows:

Column 1, line 41, after the word "products" insert *are*; column 2, line 43, for "connamic" read *cinnamic*; column 7, line 2, after "compound" insert *of the formula*; line 25, after "ketone" insert *of the formula*; line 31, for "hydrogen" second occurrence, read *hydrocarbon*;

and that the said Letters Patent should be read with these corrections therein that the same may conform to the record of the case in the Patent Office.

Signed and sealed this 8th day of February, A. D. 1949.

[SEAL]

THOMAS F. MURPHY,
*Assistant Commissioner of Patents.*